United States Patent Office 3,217,420
Patented Nov. 16, 1965

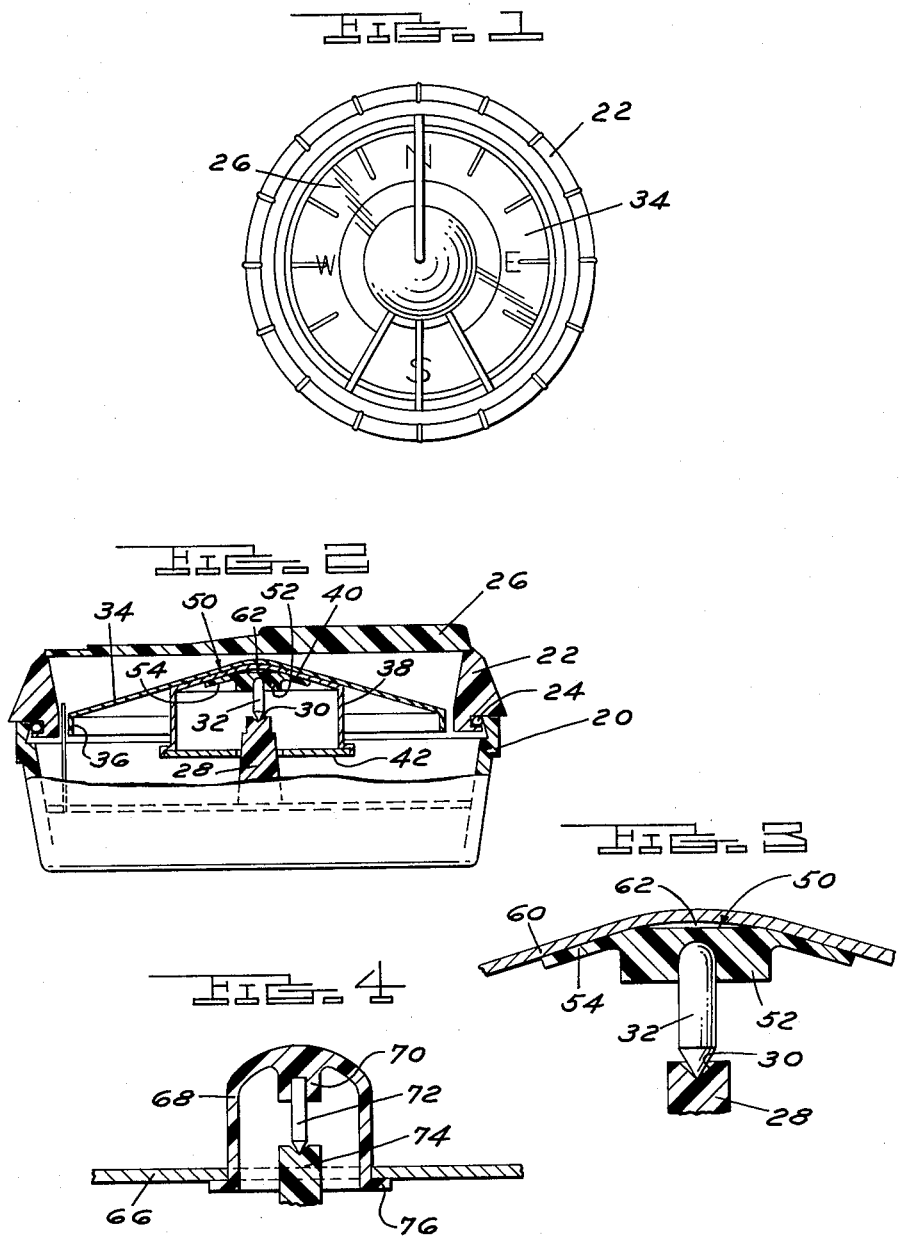

3,217,420
COMPASS CONSTRUCTION
Robert C. Dinsmore, Flint, Mich., assignor to Dinsmore Instrument Company, Flint, Mich., a corporation of Michigan
Filed Dec. 12, 1963, Ser. No. 330,104
4 Claims. (Cl. 33—222)

This invention relates to a compass construction.

It is an object of the invention to provide an improvement in construction over than shown in my recently issued U.S. Patent No. 3,069,783, dated December 25, 1962.

The type of construction under consideration is what may be called a dry compass in the sense that the compass card is not immersed in fluid to dampen its motion. Instead, the point of the compass pivot is immersed in a highly viscous material which dampens the rotary motion of the compass. On the other hand, the absence of immersing liquid within the compass housing causes the inertia effect on the compass card to be increased, and, in severe shock situations, it has been found that the normal type of compass card formed of a thin metallic sheet will permanently distort and thus destroy the balance and the effectiveness of the compass.

Accordingly, it is an object of the present invention to provide an improved construction which greatly increases the resistance of the compass card to distortion due to inertia forces resulting from shock loads.

It is a further object of the invention to provide an improved construction which can be used either on conical-shaped compass cards or on flat compass cards.

Other objects and features of the invention relating to details of construction and operation will be apparent in the following description and claims.

Drawings accompany the disclosure and the various views thereof may be briefly described as follows:

FIGURE 1 illustrates a plan view of a compass assembly.

FIGURE 2 illustrates a sectional view showing the parts in assembly.

FIGURE 3 illustrates a modified construction.

FIGURE 4 illustrates a second modification utilizing a flat compass card and a modified support.

Referring to the drawings:

A circular compass housing is composed of a dish-shaped base 20 having flaring walls which join with a bezel ring 22, the two being engaged by a snap ring 24. A transparent face plate 26 encloses the housing. A central stem member 28, mounted in base 20, terminates at its top end in a conical recess 30 which serves as a bearing support for a small pin 32 preferably formed of a wear resistant material. The recess 30 is intended to contain a small quantity of a highly viscous material which may have a viscosity of 20,000 to 1,000,000 centistokes to dampen rotation and swaying of pin 32 in the mount.

The compass card itself is a conical disc 34 having a side flange 36 and, in the embodiment shown in FIGURE 2, a cup element 38 has a surface 40 which complements the conical inner surface of the compass card 34, the skirts of the cup depending downwardly around the stem 28 and having mounted therein a circular magnetic element 42 perforated to receive the stem.

In the prior art construction, the pin 32 has passed through the cup portion 40 and the card portion 34 has had a head which has been riveted to these elements. In place of this construction, the present invention contemplates the use of a small plastic disc 50 having a relatively thick central portion 52 with a tapered flange 54 extending radially and downwardly outward. This plastic disc 50 is preferably formed of a polyethylene or polypropylene material. It is fused to the inside of the cup bottom 50 by a suitable plastic adhesive. The pin 32 is well seated in the thickened portion 52 so that it is solidly embedded therein. The plastic material of the type described is a very tough material which yet has a certain amount of resilience and high degree of elastic memory. Thus, any shock loads which are imparted to the device by reason of the inertia forces on the card assembly will be absorbed by the flexibility of the disc 50 which will return to its shape even though momentarily distorted.

In FIGURE 3, a somewhat simpler compass construction is shown wherein a single walled compass card 60 is combined with the plastic disc 50. The mounting of the pin 32 in the stem 28 is the same as previously described.

It will be noted that in both FIGURES 2 and 3, there is a central area 62 between the disc 50 and the compass card which is spaced from the card.

In FIGURE 4, where a flat compass disc 66 is illustrated, a somewhat modified type of plastic mount in the form of a bell-shaped member 68 is illustrated, this member having an inward downwardly depending center projection 70 which receives the socketed end of a support pin 72 rotatably mounted in a stem 74. The walls of the bell-shaped element 68 are flanged out at 76 and again bonded to the dial member 66 by a suitable adhesive. The reason for the shape of the member 68 in connection with this construction lies in the fact that the center of gravity of the card member should generally be below the pivot point. The use of the plastic insert makes this readily feasible and avoids a complicated and difficult shaping of the interior of the card member.

In the embodiment shown in FIGURE 4, the inherent resilience and elastic memory of the bell member 68 will absorb shock loads and protect the light metal card 66 from permanent distortion.

What I claim is:

1. In a compass of the dry type having a magnet suspended for rotation by means of a mounting pin rotatably engaging a bearing cup containing a damping fluid having a viscosity of at least 20,000 centistokes in surface contact only with said cup and a pointed portion of the pin and constituting the only non-gaseous damping fluid in the compass, the combination therewith of a compass card of relatively thin sheet material supported for rotation by said pin, and means joining together said pin and card comprising a shock-absorbing member formed of relatively tough, resilient plastic having centrally thereof a recess embedding a portion of said pin other than said pointed portion and having an annular surface outward of said central portion shaped to complement and secured to a central portion of said card.

2. A compass as defined in claim 1 in which said member comprises a disc of plastic relatively thick at its center portion and apertured centrally to receive an end of said pin, and a thinner flanged portion extending outwardly of said center portion, said flanged portion being bonded to said compass card.

3. A device as defined in claim 1 in which the said member comprises a bell-shaped plastic member having a recess formed in a thickened portion centrally and interiorly of the dome of the bell to receive an end of a supporting pin, and a flange at the lower portion of said bell bonded to a central portion of said compass card.

4. In a compass of the dry type having a magnet, a bearing cup containing a damping fluid having a viscosity of at least 20,000 centistokes, and a mounting pin supporting the magnet for rotation and having a pointed end portion immersed in said fluid and rotatably engaging the bearing cup, the other end of the mounting pin projecting out of said damping fluid and said bearing cup, the combination therewith of a generally conically shaped compass card of relatively thin sheet material, and means joining together said compass card and said pin comprising a shock-absorbing disc of relatively tough resilient plastic material having centrally thereof a thickened portion with a recess therein embedding said other end of said pin and having a tapered annular portion at its outer edge shaped to complement said conical portion of said card and bonded thereto.

References Cited by the Examiner

UNITED STATES PATENTS

| | | | |
|---|---|---|---|
| 2,087,086 | 6/1937 | De Besson | 33—222.5 |
| 2,364,908 | 12/1944 | Miller | 33—222 |
| 2,552,332 | 5/1951 | Le Van | 33—222 |
| 2,687,577 | 8/1954 | Pallotti | 33—222 |

ISAAC LISANN, *Primary Examiner.*